United States Patent [19]

Stappaerts et al.

[11] Patent Number: 5,307,365
[45] Date of Patent: Apr. 26, 1994

[54] CAVITY PUMPED, SOLID STATE LASERS

[75] Inventors: Eddy A. Stappaerts, Rancho Palos Verdes; William H. Long, Jr., Torrance, both of Calif.

[73] Assignee: Northrop Corporation, Los Angeles, Calif.

[21] Appl. No.: 975,748

[22] Filed: Nov. 13, 1992

Related U.S. Application Data

[63] Continuation of Ser. No. 741,889, Aug. 8, 1991, abandoned.

[51] Int. Cl.$^5$ ............................................. H01S 3/093
[52] U.S. Cl. ........................................ 372/72; 372/70
[58] Field of Search .................................. 372/70, 72

[56] References Cited

U.S. PATENT DOCUMENTS 4,969,155 11/1990 Kahan ..................................... 372/70
5,033,058 7/1991 Cabaret et al. ......................... 372/70

*Primary Examiner*—Rodney B. Bovernick
*Assistant Examiner*—Robert E. Wise
*Attorney, Agent, or Firm*—Terry J. Anderson; Robert B. Block; Karl J. Hoch

[57] ABSTRACT

A highly efficient pumping configuration for a solid state laser uses a diode bar pumping source producing optical energy coherent along an axis normal to the plane of the diode junctions. Pump energy is nearly collimated by a cylindrical optical fiber and applied through a minimum width injection port to a low absorption solid state laser rod in a highly reflective optical cavity including a cylindrical sleeve forming a coolant chamber around the laser rod. The nearly collimated energy is focussed to a minimum width in the plane of the injection port in order to minimize the loss of energy from the optical chamber by leakage out through the port. The laser rod is substantially evenly illuminated by the entire energy entering the cavity on the first pass. Optical energy not absorbed during illumination through is reflected within the cavity until substantially absorbed by the solid state laser rod.

2 Claims, 1 Drawing Sheet

CAVITY PUMPED, SOLID STATE LASERS

CROSS REFERENCE TO RELATED APPLICATION

This application is a continuation of our co-pending application Ser. No. 07/741,889 filed Aug. 8, 1991, now abandoned.

BACKGROUND OF THE INVENTION

This invention relates to the field of solid state lasers and, in particular, to techniques for efficiently pumping solid state lasers using coherent semiconductor laser diodes.

DESCRIPTION OF THE PRIOR ART

Although solid state lasers have seen application in many areas, their use has been limited by the relatively low efficiency which characterizes conventional solid state lasers pumped by flashlamps. The replacement of flashlamps by highly efficient semiconductor diode lasers has greatly increased the overall efficiency of such lasers. However, one factor still limiting the overall efficiency is the relatively inefficient coupling of the diode laser light into the solid state laser material.

Improvements in coupling efficiency have been proposed using a cavity which reflect multiple passes of pump light through the laser rod, i.e. U.S. Pat. No. 5,033,058 to Calvert et al. and U.S. Pat. No. 4,969,155 to Kahan. These patents, even though they are written as being generally applicable, are implicitly aimed at laser media with relatively high gain cross sections. Both patents use the example of the Nd:YAG laser, which does have an (exceptionally) high cross section, which is one of the reasons for its popularity. However, limitations still remain.

Examples of remaining deficiencies of this prior art are considerable loss of pump light during multiple-pass pumping, formation of hot spots in the laser material, and incompatibility with effective cooling of the laser material.

One conventional technique for maximizing coupling of pump light into the laser medium is to increase the absorption of pump light by the laser material through strong doping of this material. This technique allows effective absorption of the pump light in one or two passes through the laser material. However, the required strong doping may be incompatible with the conditions required for efficient operation of the solid state laser. Also, the pumping light absorption in the laser medium may be nonuniform, exhibiting hot spots which can reduce laser efficiency and result in damage to the laser material.

Important new laser media involving dopants such as Nd, Tm and Ho must be pumped by high intensities in order to allow efficient operation. These laser systems, call ground-state-depletion lasers, have an absorption strength which changes during the pumping process. Present pumping techniques, including those using multiple passes, are not able to pump these laser media in a simple and efficient manner.

SUMMARY OF THE INVENTION

In accordance with the present invention, a low absorption laser rod is placed inside a cavity with walls which are highly reflective at the pumping wavelength. Pump light produced by one or more semiconductor diode laser arrays, also called diode bars, is coupled into the cavity through one or more extremely narrow slits or injection ports in the cavity reflective coating. Laser light produced by diode bars can be focussed through the narrow injection ports because this light has the special property that it is spatially coherent in planes normal to the diode laser junctions. The pump light is absorbed during multiple passes through the laser rod, with very small leakage losses through the narrow injection ports. Pumping uniformity of the laser rod can be further enhanced through the use of one or more diffusing surfaces within the cavity.

The configuration of the present invention is suitable for pumping solid state media which require very high pumping intensities, such as ground-state-depletion lasers. High pumping intensities can be obtained inside the pumping cavity because the relatively small absorption of the laser rod and the very low losses of the pumping cavity allow the pumping intensity to build up to high levels during the multiple passes through the laser rod. Highly efficient pumping of the laser medium can be obtained even when the absorption strength of the laser rod decreases during the pumping, as is the case with ground-state-depletion lasers.

The diode-bar to laser rod coupling efficiency of the configuration of the present invention is less sensitive to diode laser wavelength and spectral bandwidth. This reduced sensitivity is important because diode bars typically have considerable wavelength spread which may be comparable to or even exceed the spectral bandwidth over which the pumping light is absorbed effectively by the laser rod. With the present invention, a reduced absorption by the laser rod does not lead to greatly reduced coupling efficiencies because the pumping light can still be efficiently absorbed by the laser rod during an increased number of passes through the rod. As an important additional benefit, the reduced sensitivity to the pumping wavelength results in an increased tolerance to temperature variations of the diode laser temperature which strongly affects the diode laser wavelength. This increased tolerance simplifies the thermal design of the laser system.

In a further aspect, the present invention provides a solid state laser system including a solid state laser rod, a highly reflective coating for forming an optical cavity surrounding the laser rod, the reflective coating including a narrow, optically transparent opening therethrough, a semiconductor laser diode array producing coherent optical energy and means for reducing the divergence of the coherent optical energy to evenly illuminate the laser rod through the narrow opening so that optical energy not absorbed by the laser rod during illumination through the narrow opening is reflected within the cavity until substantially absorbed by the rod.

In another aspect, the invention provides a method of efficiently pumping a solid state laser by positioning a solid state laser rod in a highly reflective optical cavity, producing coherent optical pumping energy with a laser diode array, reducing the divergence of the coherent optical pumping energy, and applying the reduced divergence optical energy to evenly illuminate the laser rod through a narrow opening in the reflective cavity so that optical energy not absorbed by the laser rod during illumination is reflected within the cavity until substantially absorbed.

The present concept explicitly addresses the problem of pumping lasers with (1) low gain cross sections, such as TM:Host, Tm:Ho:Host, and some weaker, less popular transitions in Nd:Host. Examples of host materials are YAG and YLF. In addition to the low gain cross section, the present invention particularly addresses the case of (2) ground-state depletion lasers (GSDs), which have the property that the absorption of the laser rod decreases with time as the medium is pumped, while also requiring that a large fraction of the ground-state must be excited in order to obtain efficient operation.

Characteristic (1), and even more so (1) and (2) taken together, lead to the following design requirements:

(a) the absorbed pumping energy per unit volume must be high, much higher (order of magnitude) than in common Nd:YAG lasers (b) for GSDs, a large fraction (>50%) of the ground-state ions must be excited, even while the rod absorption is decreasing as ions are removed from the ground state by the pumping pulse (c) for GSDs, the pumping must be spatially uniform, i.e. no unpumped volume must be left, since unexcited ions represent absorption losses for the laser (which has low gain because of the low emission cross section and is therefore very sensitive to losses).

The following design characteristics are disclosed in the present invention and are found to satisfy the above requirements.

To satisfy (a), the ratio of the cavity diameter to the rod diameter must be large, typically 10 or even higher. This happens because the energy delivered by the laser diodes must be absorbed in a small volume with high energy density, and a significant number of diodes is required around the circumference (each diode emits a limited amount of energy).

The small absorption per pass, and requirement (b) results in absorption becoming even less as pumping goes on, leading to the necessity of very small cavity losses (high-Q cavity). As is pointed out in herein (but not in the prior art), diode-laser light is nearly diffraction-limited in planes orthogonal to the junction of the emitting diode, and it can therefore be focussed to very small dimensions indeed, on the order of an "optical wavelength", i.e. on the order of 1 micron. Very low losses can therefore be realized by making the slits very narrow, in principle as low as a few microns, and practically on the order of tens of microns and <100 um. FIG. 3 of this disclosure, but no figures in the prior art, explicitly shows a design which can be used to meet this requirement: the diode light has a focus on or near the very narrow slit into the cavity. With the resulting very low losses, the laser pumping can be efficient even as the absorption decreases (in GSD lasers). Note that the prior art write-ups only disclose diverging or collimated diode light, never focussed or converging light.

Because the cavity diameter is much larger than the rod diameter, special precautions must be taken to obtain a high efficiency for coupling the pump light, once it has been focused into the cavity, into the rod as opposed to losing it in absorption by the walls etc. (the cavity is almost "empty"). In particular, the reflecting coating on the cavity cylinder must be very smooth, not "diffuse" as in the '155 patent. If diffusers are used to maximize pumping spatial uniformity (c), the diffusing surface should be the surface of the laser rod itself, or a diffuser placed very close to it. Especially in cases where the rod (host) refractive index is close to that of the coolant, as in the case of a YLF host material, the rod surface must be treated to obtain the desired scattering characteristics.

These and other features and advantages of this invention will become further apparent from the detailed description that follows which is accompanied by drawing figures. In the figures and description, numerals indicate the various features of the invention, like numerals referring to like features throughout both the figures and the description.

DETAILED DESCRIPTION OF THE PREFERRED EMBODIMENT(S)

Figure 1:
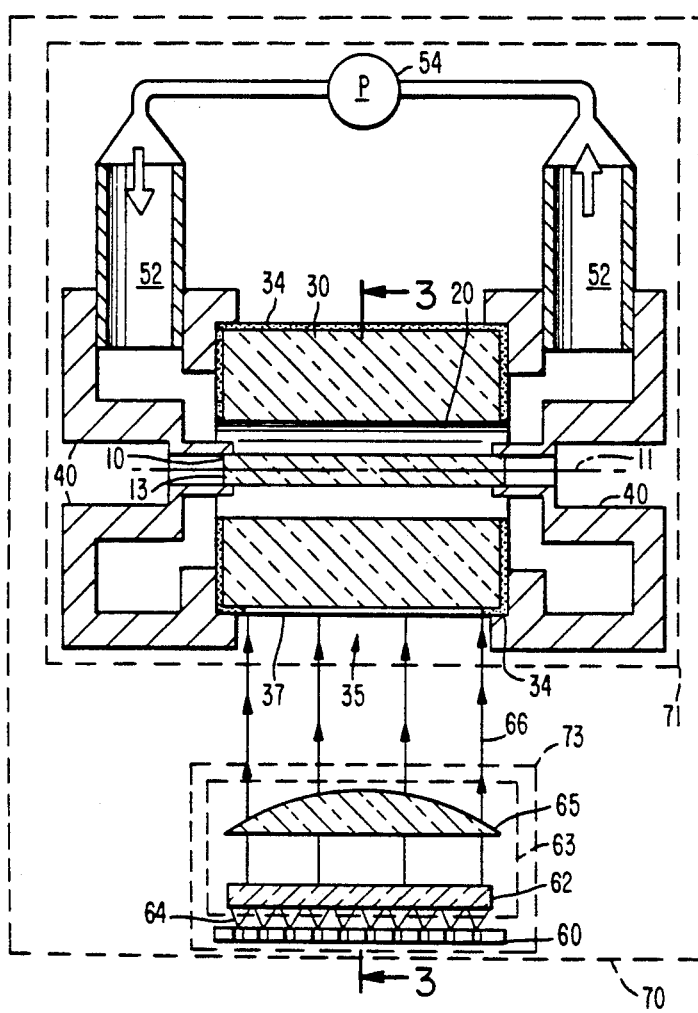
FIG. 1 is a cross sectional view of a preferred embodiment of an efficient, cavity pumped solid state laser system according to the present invention.

FIG. 1 is a cross-sectional view of an embodiment of laser system 70 in accordance with the present invention. Laser system 70 includes cavity assembly 71 and laser pump assembly 73. Cavity assembly 71 includes laser rod 10, cylindrical sleeve 30 surrounding laser rod 10 coaxial with central axis 11 and spaced at a distance from laser rod 10 to produce coolant chamber 20. Coolant chamber 20, cylindrical sleeve 30 and laser rod 10 together form optical cavity 35. Cavity assembly 71 also includes coolant pump 54 and end plates 40 which support the components of cavity assembly 71 in a fixed relationship and provide a communication channel for coolant 52 between coolant chamber 20 and coolant pump 54.

Laser pump assembly 73 includes laser pump 60, which generates laser pump output 64, and optical subsystem 63 which applies laser pump output 64 to cavity assembly 71.

Laser rod 10 is a circular cylinder, constructed from crystal material 13. A typical material for crystal material 13 is yttrium aluminum garnet doped with thulium, commonly known as Tm:YAG. Other useful dopants include Nd and Ho which may be doped into various other host crystal materials providing different output wavelengths.

The geometry and size of laser rod 10 are determined by the particular application for laser system 70. A typical geometry and size for laser rod 10 is a circular cylinder about 1 cm long and 1 mm in diameter. In accordance with conventional practice, the ends of laser rod 10 must be accurately ground to be nearly parallel to each other and perpendicular to central axis 11.

The diameter of the rod may be small compared to the absorption depth (the depth at which the intensity drops to 1/e of its initial value) it presents i.e., an order of magnitude smaller, so that light is not attenuated verymuch in passing through the rod. In this way the concentration can be optimized for a class of lasers where it is necessary to put over 50% of the ground state into the excited state, by adjusting the dopant level to such a small value. This usually reduces pumping efficiency, but, in the present invention pumping efficiency is maintained by the remaining structural features while extraction efficiency is enhanced by the lower concentration and absorption depth.

The outside surface of laser rod 10 may be slightly roughened to produce a scattering or diffusion of unabsorbed pump energy resulting in a uniform flux of pump energy within optical cavity 35. Coolant 52, passing through coolant chamber 20 as described below, may provide an additional source of diffusion within optical cavity 35. Diffusion may also be further enhanced by other conventional techniques, such as the addition of suspended particles, not shown, in coolant 52.

Cylindrical sleeve 30 must be highly transparent to pump output 66 from laser pump assembly 73 to minimize undesired absorption therein. Cylindrical sleeve 30 may conveniently be formed from materials such as fused silica or an undoped version of crystal material 13.

Reflective coating 34 is applied to the outer surface and both ends of cylindrical sleeve 30 to form the reflecting surface for optical cavity 35. Coating 34 must be highly reflective at the wavelength of laser pump output 64 to provide near-total reflection of unabsorbed pump energy within optical cavity 35. Substantially all of the outside surface of cylindrical sleeve 30 is coated with reflective coating 34 except for an area associated with injection port 37, as described below in greater detail with reference to FIG. 2. Reflective coating 34 may be applied by conventional vacuum deposition techniques to cylindrical sleeve 30 to provide a reflectivity of about 97% for silver, about 98.5% for gold and about 99.5% for conventional, multilayer dielectric coatings.

Figure 2:
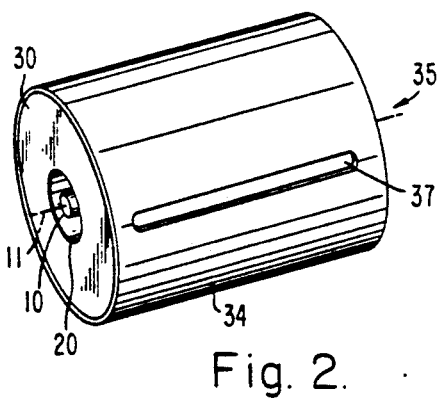
FIG. 2 is an isometric view of the cylindrical sleeve of the laser system shown in FIG. 1.

As shown in FIG. 2, injection port 37 is formed as a transparent opening through reflective coating 34 to permit pump output 66 to enter optical cavity 35. Within injection port 37, reflective coating 34 must be completely absent. Injection port 37 may be formed by conventional techniques, such as masking a portion of cylindrical sleeve 30 before reflective coating 34 is applied, or by removal of a portion thereof.

The geometry and dimensions selected for injection port 37 will vary with the technique used for injecting pump output 66 into optical cavity 35. In the preferred embodiments of the present invention, shown in FIGS. 1 and 2, injection port 37 is a rectangular slit oriented parallel to central axis 11 of about the same length as laser rod 10.

Injection port 37 must be wide enough to admit pump output 66 into optical cavity 35. The minimum width for injection port 37 is set by the diffraction limit of the optics being used. In an exemplary configuration of the preferred embodiment, this was calculated to be on the order of 50 $\mu$m. A width of from about 100 $\mu$m to about 200 $\mu$m may, however, be used to provide a satisfactory low loss cavity.

The width of all the ports or openings taken together is characterized as a small fraction of the total surface of the chamber. By small, it is meant that the ratio of the sum of all the port areas to the total area of the cavity wall less the port area should be at least an order of magnitude less than the absorption (per pass) of the rod (itself less than 20%).

Coolant pump 54 is used to circulate coolant 52 through coolant chamber 20 to maintain laser rod 10 at a preselected operating temperature. Coolant 52 may be either liquid or gas, in accordance with the requirements of the particular application for laser system 70. Various temperature control systems and heat exchangers for this application are well known in the art and are widely available.

The radial extent of the coolant channel is preferably greater than the thermal boundary layers i.e., greater than about 1 mm for a rod length of 1 cm.

End plates 40 are fabricated from a thermally stable material with good heat transfer characteristics, such as aluminum or copper. Surfaces of end plates 40 which contact or are exposed to cylindrical sleeve 30 or laser rod 10 should be highly reflective to prevent energy absorption by those surfaces.

Laser pump 60, which provides laser pump output 64, may be a linear array of semiconductor diode lasers, such as a laser diode bar, which provides coherent energy along axes normal to the plane of the diode junctions. Laser pump 60 is located external to optical cavity 35 and may conveniently be about the same length as injection port 37. Laser diode bars are available which emit radiation at different frequencies and may be selected to match the requirements of laser rod 10. Convenient materials include gallium arsenide and gallium arsenide phosphide.

In alternate embodiments not shown, multiple arrays of diodes may be used to increase the energy provided by the solid state laser. Where a plurality of pumping arrays is used, a matching plurality of injection ports may also be used. Further, the length of the array or arrays may be increased beyond that of the injection ports as long as appropriate means are provided for efficiently applying substantially all of the energy through the injection ports.

As shown in FIG. 1, laser pump 60 is oriented so that it is parallel to laser rod 10. Laser pump output 64 is coherent normal to the plane of the active junction layer in laser pump 60. Cavity assembly 71 is aligned with laser pump assembly 73 so that central axis 11 is in this plane. This enables the divergence of laser pump output 64 to be reduced, and/or laser pump output 64 to be focussed, for coupling into optical cavity 35 through the aperture of injection port 37, as will be discussed in greater detail below.

Figure 3:
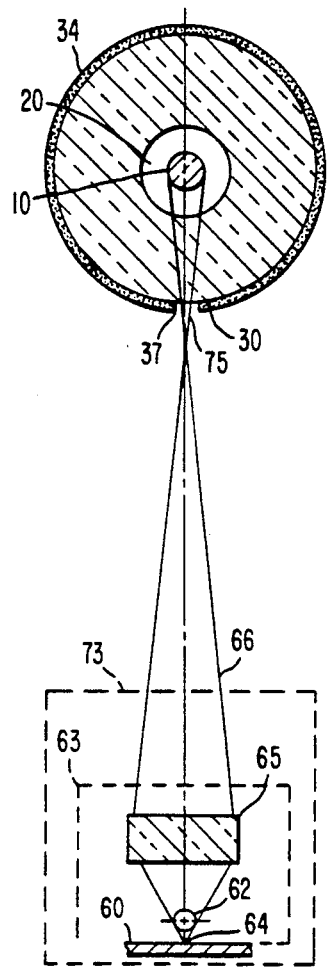
FIG. 3 is a cross sectional view of the laser system of FIG. 1, taken along line A—A.

Referring now specifically to FIGS. 1 and 3, the process of introducing pump energy into optical cavity 35 will now be described. Optical sub-system 63 collects laser pump output 64 from laser pump 60 and applies it through injection port 37 into optical cavity 35. Laser pump output 64 can be focussed to a dimension as small as the diffraction limit of the optical system being used. This permits the minimum width of injection port 37 to be no larger than absolutely necessary to permit injection of the optical energy into the cavity, thereby minimizing loss of energy out of optical cavity 35 by leakage through injection port 37.

In the embodiment of the invention shown in FIGS. 1 and 3, the divergence of laser pump output 64 is reduced by optical sub-system 63, including first collimating lens 62 and second focussing lens 65. First collimating lens 62 may be a cylindrical optical fiber of about the same length as laser rod 10 and injection port 37. The diameter of lens 62 depends upon the physical configuration of laser system 70 and would be in the range of about 100 $\mu$m to about 500 $\mu$m for the preferred embodiment described herein. First collimating lens 62 may be positioned from about 10 $\mu$m to about 50 $\mu$m in front of laser pump 60 to collect and collimate, or nearly collimate, the sharply diverging rays, and apply them to second focussing lens 65.

Second focussing lens 65 may be a plano-convex lens positioned to apply energy from first lens 62 through injection port 37 to substantially evenly illuminate laser rod 10 in optical cavity 35. First lens 62 and second lens 65 may be made of glass, fused silica, or other suitable optical material.

In FIG. 3, the minimum size of pump output 66 is at focal point 75 which is shown displaced outward from reflective coating 34 to better illustrate the ray paths from laser pump 60 to laser rod 10 and to indicate that minimum size of pump output 66 need not be achieved exactly at injection port 37. In FIG. 3, the width of injection port 37 has been slightly increased to compensate for the outward displacement of focal point 75 from cylindrical sleeve 30.

In addition to providing a minimum width of pump output 66 in the plane of injection port 37, optical subsystem 63 must apply substantially all of pump output 66 which enters optical cavity 35 to evenly illuminate laser rod 10 to maximize coupling efficiency and minimize degradation, such as hot spots, in laser rod 10. Once pump output 66 first passes through laser rod 10, it will be reflected within optical cavity 35 making multiple passes through laser rod 10 until substantially all the energy in pump output 66 is absorbed therein. In this manner, over doping of laser rod 10 may be avoided, while providing a high coupling efficiency by minimizing losses at each reflection and/or leakage out through injection port 37. In the preferred embodiment, laser rod 10 would typically absorb on the order of 10% of the energy remaining in pump output 66 during each pass therethrough.

Figure 4:
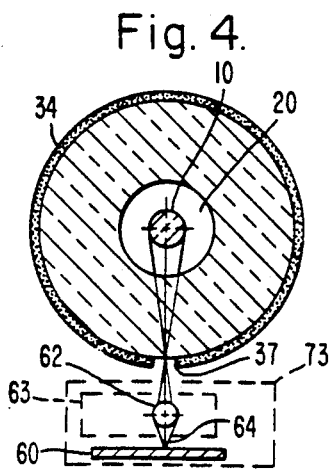
FIG. 4 is a cross sectional view of an alternate embodiment of the present invention.

FIG. 4 illustrates another embodiment of laser system 70 in which optical sub-system 63 uses only one optical element, first collimating lens 62. The elements of laser pump assembly 73 are positioned closer to cylindrical sleeve 30 so that laser pump output 64 is collimated by lens 62 and evenly applied to laser rod 10 on its first pass through injection port 37. It is not necessary to use second focussing lens 65 to focus laser pump output 64 to a minimum width, as is required with the embodiment shown in FIG. 3. In this embodiment, lens 62 may also conveniently be a cylindrical fiber of diameter of about 100 $\mu$m to about 500 $\mu$m and approximately the same length as injection port 37.

Thus, there has been provided solid-state laser system including a rod solid, transparent medium, doped with one or more minority species, which absorb light in one band of frequencies (pump band) and transfer that energy to a state where it is available for stimulated emission.

The concentration of said minority species is set by the conditions for efficient lasing (extraction), which concentration may provide only limited absorption at the pump wavelength, i.e., the fraction absorbed in passing through the diameter of the rod may be less than 20%. Such a low value of absorption would ordinarily (as in the prior art) result in low pumping efficiency (fraction of diode pump light actually absorbed in the rod).

Elements of the present invention which provide high (>80%) pumping efficiency are:

a) Ratio of total slit area to reflecting surface area of chamber should be at least an order of magnitude smaller than the single-pass absorption through the rod (which may itself be less than 20%)

b) Diffuse reflection (scattering) at the outer cylindrical wall of the pump chamber must also be at least an order of magnitude smaller than the single-pass absorption through the rod. (diffuse scattering at this surface is almost as bad as loss through one of the slits).

c) For a given optical index of the rod, the index of the fluid must be chosen so that light entering through one slit has a low probability (<2%) of exiting the chamber through the same slit after only two passes through the rod. This is achieved when the following condition is satisfied. (nr/nf−1 is not equal to Dr/Dc, where the inequality is at least greater than a factor of 2; and, where nr is the refractive index of the rod, nf is the refractive index of the fluid, Dr is the diameter of the rod, and Dc is the diameter of the cavity.

The general function of the optical subsystem may be summarized as a method for focusing the diode pump light on the narrow slit which gives high (>98%) transmission through the slit and allows the light to expand out to evenly illuminate the laser rod with a minimum (<2%) fraction missing the rod altogether. And, the uniformity of energy deposition in the rod is enhanced by a roughened outer surface of the laser rod which produces 0 to 100% diffuse scattering; the more diffuse scattering the better the deposition uniformity. The rough surface may be effected by treating (etching, grinding, sand blasting . . . ) or by coating with small dielectric crystalline or glass particles of small diameter, which themselves must be transparent to pump light and provide predominantly forward scattering.

While this invention has been described with reference to its presently preferred embodiments, its scope is not limited thereto. Rather, such scope is only limited insofar as defined by the following set of claims and all equivalents thereof.

What is claimed is:

1. A solid state laser system comprising,
an elongate, solid state laser rod,
means forming a resonant cavity for supporting lasing in said rod,
means forming an elongate chamber surrounding said rod and including an inwardly facing wall having a highly specularly reflective surface of high reflectivity, said wall and surface being shaped to surround and to focus on said rod so that radiant energy emanating from the region of said rod is redirected by the surface back toward said rod by essentially specular reflection,
means associated with said reflective surface for forming an elongate narrow opening through said surface,
said opening having a tangential extent along the surface and lying in a plane cutting across the elongate dimension of said chamber which is limited so that the area of said opening is, smaller than an amount derived from the condition,
that the ratio of the opening area to the total area of the reflective surface less the area of the opening shall be at least an order of magnitude less than the absorption, per pass, of the rod,
pump means of providing radiant energy capable of pumping said rod by absorption of said energy as it passes through said rod, and
means of causing said pump means to illuminate said rod through said opening,
said rod having diameter which is an order of magnitude smaller than the absorption depth it represents,
the energy not absorbed by said rod being directed from the rod to the reflective surface of said wall from which it is redirected to the rod for absorption or redirection and reflection until substantially absorbed in the rod.

2. The solid state laser system claimed in claim 1, wherein said solid state laser rod further includes:
a roughened outer surface for further diffusing said energy.

* * * * *